(12) United States Patent
Chiefetz et al.

(10) Patent No.: US 8,005,640 B2
(45) Date of Patent: Aug. 23, 2011

(54) THERMAL RESPONSE GEOTHERMAL TESTING UNIT

(75) Inventors: Daniel Chiefetz, Deerfield, IL (US); Erik Larson, Evanston, IL (US); Robert Olden, Chicago, IL (US); Ben Heymer, Chicago, IL (US)

(73) Assignee: Indie Energy Systems Co., LLC, Evanston, IL (US)

( * ) Notice: Subject to any disclaimer, the term of this patent is extended or adjusted under 35 U.S.C. 154(b) by 0 days.

(21) Appl. No.: 12/973,478

(22) Filed: Dec. 20, 2010

(65) Prior Publication Data
US 2011/0125451 A1 May 26, 2011

Related U.S. Application Data

(60) Provisional application No. 61/287,987, filed on Dec. 18, 2009.

(51) Int. Cl.
*G06F 19/00* (2011.01)
(52) U.S. Cl. .................................. 702/130; 73/23.35
(58) Field of Classification Search .................. 702/130, 702/182–185; 73/23.35
See application file for complete search history.

(56) References Cited

U.S. PATENT DOCUMENTS

2010/0095742 A1* 4/2010 Symington et al. ........... 73/23.35

OTHER PUBLICATIONS

Gustafsson et al. "Thermal Response Test—Power Injection Dependence," Lulea University of Technology, Swedish Society of HVAC Engineers (2003).

"Thermal Conductivity Testing Specification and Procedures," Ewbank and Associates—Geo Systems Professionals (Date unknown, but prior to Dec. 2010).
Gehlin, S. "Thermal Response Test: Method Development and Evaluation," Doctoral Thesis, Lulea Tekniska University, ISSN 1402-1544 (2002).
Sanner et al. "Technology, Development Status, and Routine Application of Thermal Response Test," Proceedings of European Geothermal Congress 2007, Germany, pp. 1-6 (2007).
Hellstrom, G. "Thermal Response Test," Borehole No. 1, Mining University Ostrava, NeoEnergy Sweden AB (May 2010).
Poppei et al. "Innovative Improvements of Thermal Response Test," Intermediate Report, Commissioned by Swiss Federal Office of Energy (BFE), pp. 1-34 (2006).
Gehlin, S. "Thermal Response Test—In Situ Measurements of Thermal Properties in Hard Rock," Licentiate Thesis, Lulea Tekniska University, ISSN: 1402-1757 (1998).
Spitler et al. "In Situ Measurement of Ground Thermal Properties," Proceedings of Terrastock, vol. 1, Stuttgart, pp. 165-170 (2000).
Witte, H. "Advances in Geothermal Response Testing," Paskoy, H.Ö. (ed.), *Thermal Energy Storage for Sustainable Energy Consumption*, pp. 177-192, Springer (2007).

* cited by examiner

*Primary Examiner* — Edward Raymond

(57) ABSTRACT

An apparatus for performing a thermal response test to determine thermo-physical properties of a geothermal heat exchange resource. The apparatus includes a geothermal heat exchanger adapted to circulate a fluid through a loop in a sample borehole in the geothermal heat exchange resource and a variable speed pumping system capable of time-dynamic control of a fluid flow rate of the fluid. A multi-stage heating system is capable of applying a series of time-dynamic heat pulses to the fluid. The apparatus further includes a fluid temperature sensor and one or more fluid pressure, fluid density and/or fluid flow rate sensors, the sensors measuring data on the properties of the fluid that are predictive of the thermo-physical properties of the geothermal heat exchange resource.

20 Claims, 17 Drawing Sheets

TEST SITE INFORMATION

| SAMPLE 0 | TEST BOREHOLE REFERENCE #: | 54 | |
|---|---|---|---|
| | TEST BOREHOLE DEPTH: | 703 | ft |
| | EXCHANGER PIPE DIAMETER | 1 1/4 | in, NOMINAL |

TEST PARAMETERS

| TESTED SEPTEMBER 3, 2010 BY DAN COUILLARD | METRIC UNITS | | IMPERIAL UNITS | |
|---|---|---|---|---|
| AVERAGE FLUID FLOW RATE | 0.568 | l/s | 9.0 | gpm |
| AVERAGE TEST POWER | 14.01 | kW | 47.8 | MBH |
| ANTIFREEZE TYPE | NONE | | | |
| ANTIFREEZE CONCENTRATION | 0.0% | | | |
| ESTIMATED FLOW TYPE | TURBULENT | | | |

LINE SOURCE ANALYSIS RESULTS

| ANALYZED SEPTEMBER 7, 2010 BY BEN HEYMER | METRIC UNITS | | IMPERIAL UNITS | | UNCERTAINTY |
|---|---|---|---|---|---|
| AVERAGE UNDISTURBED GROUND TEMP. | 12.8 | °C | 55.0 | °F | - |
| AVERAGE THERMAL CONDUCTIVITY | 2.929 | W/m-K | 1.694 | Btu/hr-ft-°F | ±17.7% |
| AVERAGE THERMAL DIFFUSIVITY | 0.106 | $m^2$/DAY | 1.136 | $ft^2$/DAY | ±19.3% |

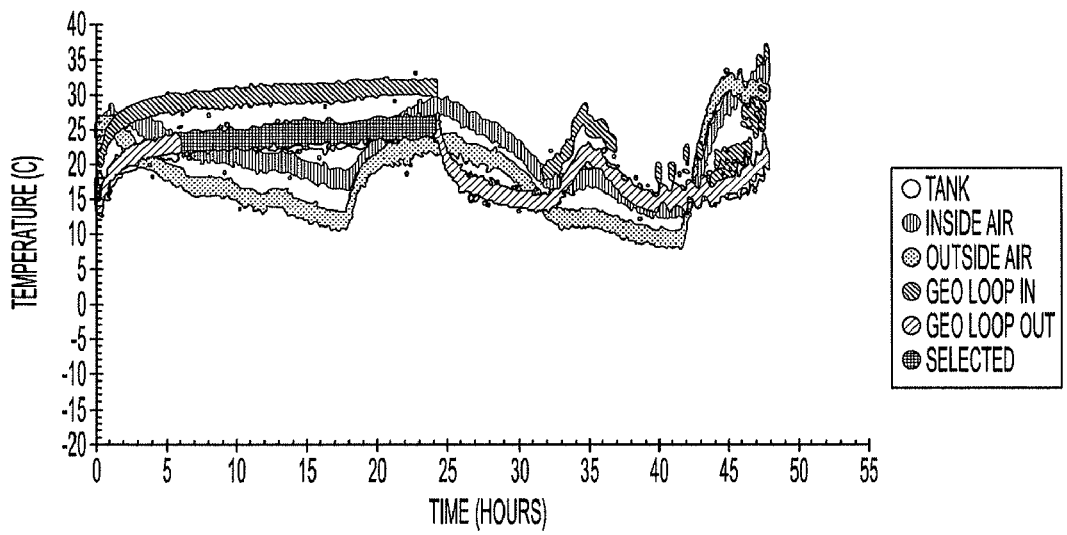

FIG. 14

THERMAL RESPONSE GEOTHERMAL TESTING UNIT

CROSS REFERENCE TO RELATED APPLICATION

This application claims the priority of U.S. Provisional Application No. 61,287,987, filed on Dec. 18, 2009, which is incorporated herein by reference.

BACKGROUND

The present invention relates generally to thermal response testing (TRT) for geothermal-based heating, ventilation, and air conditioning (HVAC) systems.

It is widely recognized that geothermal-heat-exchange-based HVAC systems offer operational cost advantages over conventional system alternatives. Because, however, it may be costly to construct the geothermal heat exchanger (GHEX), i.e. a closed-loop piping system constructed beneath the surface of the earth to transfer heat between a fluid and the earth surrounding the piping system (also known as a borehole heat exchanger, energy field, well field, loop field, or geo-field), it is crucial to correctly size the GHEX to maximize long-term financial performance for a facility.

Several methods and commercially available tools exist to determine the dimensions of a GHEX. The quality of the results for such methods and tools is strongly correlated to the accuracy of the input information. Oftentimes this information, especially thermo-physical earth properties, is merely assumed or estimated because of the cost and complexity of performing accurate site-specific tests, and the high uncertainty associated with industry standard testing methods. Thus, a need exists for a device that can accurately and cost-effectively measure the actual, site-specific thermo-physical earth properties, thereby allowing geothermal-based HVAC installers to install more efficient and less expensive systems.

Prior art methods can generally be divided into two categories: analytical and numerical. Static analytical methods (also commonly referred to as the line-source method) are most typical within the industry and are widely documented by industry publications such as the American Society of Heating, Refrigerating and Air-Conditioning Engineers (2007 ASHRAE Handbook—HVAC Applications, section 32.12-32.13) as well as university publications (Gehlin 1998; Mogensen 1983; Witte et al. 2002). The analytical method involves injecting heat into a GHEX at a steady rate and calculating a formation thermal conductivity value from a one-dimensional linear regression of the recorded temperature data. Analytical methods, however, provide only one of several important thermo-physical properties and may misinform GHEX designs where time dynamic interactions between the earth and the connected HVAC system are significant. This method is also costly to perform due to steady-state power requirements and the need for human interaction and supervision.

Numerical methods, meanwhile, have been proposed by researchers (see Henk J. L. Witte 2007), but have not been developed into practice. Commercially available tests and test equipment, including those provided by Geothermal Resource Technologies Inc. (www.grti.com), generally include a fixed-speed pump, an electric heating element, temperature sensors, and a data logger. The equipment is designed to perform static tests according to the analytical method only, not numerical methods.

These prior art methods also fail to measure fluid pressure, a significant component of the overall heat transfer equation. Neglecting to measure fluid pressures may result in errors of approximately 1% when calculating total heat transfer power in a typical GHEX. Fluid pressure information, especially when coupled with variable-flow fluid pumping systems, offer GHEX designers greater knowledge of the pumping requirements for the eventual geothermal-heat-exchange-based HVAC system.

Furthermore, commercially available tests and test equipment do not provide the ability to easily measure the density of the test fluid or to filter and remove air from the fluid during the test.

SUMMARY

The present invention relates generally to thermal response testing (TRT) for geothermal-based heating, ventilation, and air conditioning (HVAC) systems. Specifically, the present invention involves TRT of a local site for geothermal-heat-exchange-based HVAC systems to provide engineers and designers with accurate thermo-physical information about the specific on-site geological formation. The invention may measure and validate the geothermal ground resource for heating and cooling, and may allow energy calculations to be performed that determine accurate geothermal HVAC system sizing, and accurate geothermal energy savings projections.

According to one embodiment, the invention relates to an apparatus for performing a thermal response test to determine thermo-physical properties of a geothermal heat exchange resource. The apparatus includes a geothermal heat exchanger adapted to circulate a fluid through a loop in a sample borehole in the geothermal heat exchange resource and a variable speed pumping system capable of time-dynamic control of a fluid flow rate of the fluid. The apparatus further includes a multi-stage heating system capable of applying a series of time-dynamic heat pulses to the fluid. The apparatus includes a fluid temperature sensor and one or more fluid pressure, fluid density and/or fluid flow rate sensors, the sensors measuring data on the properties of the fluid that are predictive of the thermo-physical properties of the geothermal heat exchange resource.

According to another embodiment, the apparatus may include a computer-based controller. The computer-based controller may automatically record thermal response test data to a digital storage media, automatically execute a time-dynamic thermal response test procedure, or automatically execute an algorithm-based thermal response test procedure during which the test parameters may vary as functions of measurements from the system.

According to a further embodiment, the apparatus may include at least one safety device to protect equipment operators and equipment in the event that test conditions exceed design limitations. A further device may enable or disable a remote power source, such as an internal-combustion electrical power generator, according to the requirements of the test.

According to one embodiment, the apparatus may include a device allowing a sensor probe to be inserted directly into, and recaptured directly from, the inside of a geothermal heat exchanger fluid pipe.

According to another embodiment, the apparatus may include a remote data broadcasting device to receive and transmit test data and a remote data repository system. The broad casting device may further broadcast the system measurements to a remote monitoring system to remotely observe and control the device.

According to a further embodiment, the sample geothermal heat exchanger may be one of a vertical closed-loop geothermal borehole, a horizontal closed-loop borehole or another heat storage medium.

According to one embodiment, the test unit may be a self-contained mobile testing unit to be used on-side at the sample geothermal heat exchanger. The test unit may include at least one of a multiple stage heater, a variable speed pump, a direct digital control, a computer that allows for highly specific and detailed tests to be run, a broadcasting device that includes equipment to broadcast the system wirelessly and a wireless monitoring system.

According to another embodiment, the invention relates to a method for performing a thermal response test to determine the thermo-physical properties of a geothermal heat exchange resource. The method includes the steps of providing a geothermal heat exchanger coupled with fluid in a sample borehole in the geothermal heat exchange resource and performing a thermal response test on the geothermal heat exchange resource. Performing the thermal response test includes the steps of controlling a time-dynamic flow rate of the fluid using a variable speed pumping system and applying a series of time-dynamic heat pulses via a multi-stage heating system. The method further includes collecting test data including fluid temperature and one or more of fluid pressure, fluid density and/or fluid flow rate, and determining the thermo-physical properties of the geothermal heat exchange resource.

According to a further embodiment, the method may include performing a thermal response test computer simulation to generate a computer algorithm to control the thermal response test. The method may include performing the thermal response test on the geothermal resource, uploading test data generated from the thermal response load test to a webserver, analyzing the test data to determine the thermo-physical properties of a geothermal heat exchange resource, simulating a geothermal-heat-exchange-based HVAC system using a computer energy simulation, calculating energy savings information for the geothermal-heat-exchange-based HVAC system and sizing the geothermal heat exchange system for optimal construction.

According to a further embodiment, the invention may relate to a non-transitory computer readable medium storing computer readable program code for causing a computer to perform a process. The code may include steps for accessing a test procedure plan and performing a thermal response test based on the test procedure plan. The thermal response test includes the steps of controlling the time-dynamic control of a fluid flow rate using a variable speed pumping system of a sample geothermal heat exchanger and applying a series of time-dynamic heat pulses via a multi-stage heating system. The code further includes the steps of recording measured test data from the thermal response test and saving the measured test data to a storage medium.

According to another embodiment, the program code includes the steps of downloading a test procedure algorithm over a wireless internet connection, reading measured test data, calculating test procedures and parameters based on measure test data, safely terminating the test if conditions exceed design limitations, enabling or disabling an external power source, displaying measurement data for all sensors, displaying control signals, recording measurement data for all sensors, saving measurement data to a storage medium and transmitting data to a remote web server over a wireless internet connection.

According to one embodiment, the program code may include the steps of reading data values from a thermal response test, analyzing test data to determine the thermo-physical properties of a geothermal resource, calculating the sizing and performance of a geothermal heat exchange system for a geothermal-heat-exchange-based HVAC system, simulating the geothermal-heat-exchange-based HVAC system using a computer energy simulation and calculating energy savings information for the geothermal-heat-exchange-based HVAC system.

According to another embodiment, the TRT may be run as an on-site test on a sample geothermal borehole, using a self-contained mobile testing unit. The unit may contain equipment and computers that are capable of simulating an actual geothermal system's energy loading of the earth. The mobile testing unit contains data broadcasting systems for remote data transmission.

According to one embodiment, the invention may perform an algorithm-driven thermal response load test on a GHEX or sample borehole in the GHEX. The algorithm may be derived from a heating and cooling energy simulation performed for the future or existing building that will use the closed-loop geothermal borehole as a heating and cooling source. The test data may provide information that is fed back into the geothermal building analysis to accurately assess the sizing and performance of the geothermal heat exchange system for the building HVAC system. The data may include thermal response measurements, flow rate measurements, temperature measurements, pressure measurements, and other measured variables, that indicate the ability of the geological formation to transfer, store, dissipate, and recuperate heat loss and gain. Effectively, this may be a simulation of how a building will load the earth in a geothermal HVAC system, prior to building the system, in order to more scientifically design and define the future system to be built.

According to another embodiment, variable flows and heating intensities may be used to provide much greater granularity to the TRT. The invention may execute test routines that vary with time, which allows indirect measurement of any and all relevant parameters associated with geothermal heat exchange systems. The invention may measure pressures and may provide different rates of flow and heat injection in order to supply engineers with data used to optimize pumping systems for geothermal heat exchange systems. In order to minimize assumptions, the invention includes equipment for measurement of heat exchange fluid properties, including fluid density.

According to one embodiment, the test may be driven by a control algorithm from the energy simulation of the building to be built on the site. The test may run for a period of less than 36 hours and may yield results of greater or equal accuracy compared to prior art test methods with minimum durations of 36 hours. The optimal length of time may be determined by the particular thermo-physical properties of the site and may vary from site to site. The information may be broadcasted wirelessly from the testing unit, to a web server. The data being broadcasted are the measured values of the thermal response test including temperatures, flow rates, and other measured values.

According to another embodiment, once the information from the test is received, it may be input into GHEX dimensioning software tool or a transient energy computer simulation tool, to determine the thermo-physical properties of the test site. The results of such analysis may be compiled into a test report. The test may allow a more accurate and economical design of the geothermal HVAC system, and may provide more accurate energy savings information so that designers and owners can make business decisions on the geothermal system size, etc. The test is more accurate, and more powerful than the prior art.

According to one embodiment, the invention may use an algorithm derived from the building heating and cooling energy simulation to control the thermal response test that is derived from the specific building's energy model that will be built on the site, and heated and cooled by the geothermal HVAC system. The equipment may include multiple stage heaters, variable speed pumps, direct digital controls and computers that allow for highly specific and detailed tests to be run. This contrasts to the steady-state, single speed saturation method that represents the current state of the art.

According to another embodiment, the invention may be used for thermal response testing and geothermal resource validation for commercial, public, residential, health care, government, or educational buildings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

FIG. 14 depicts a thermal response test result summary, according to an embodiment of the invention.

DETAILED DESCRIPTION

Figure 1:
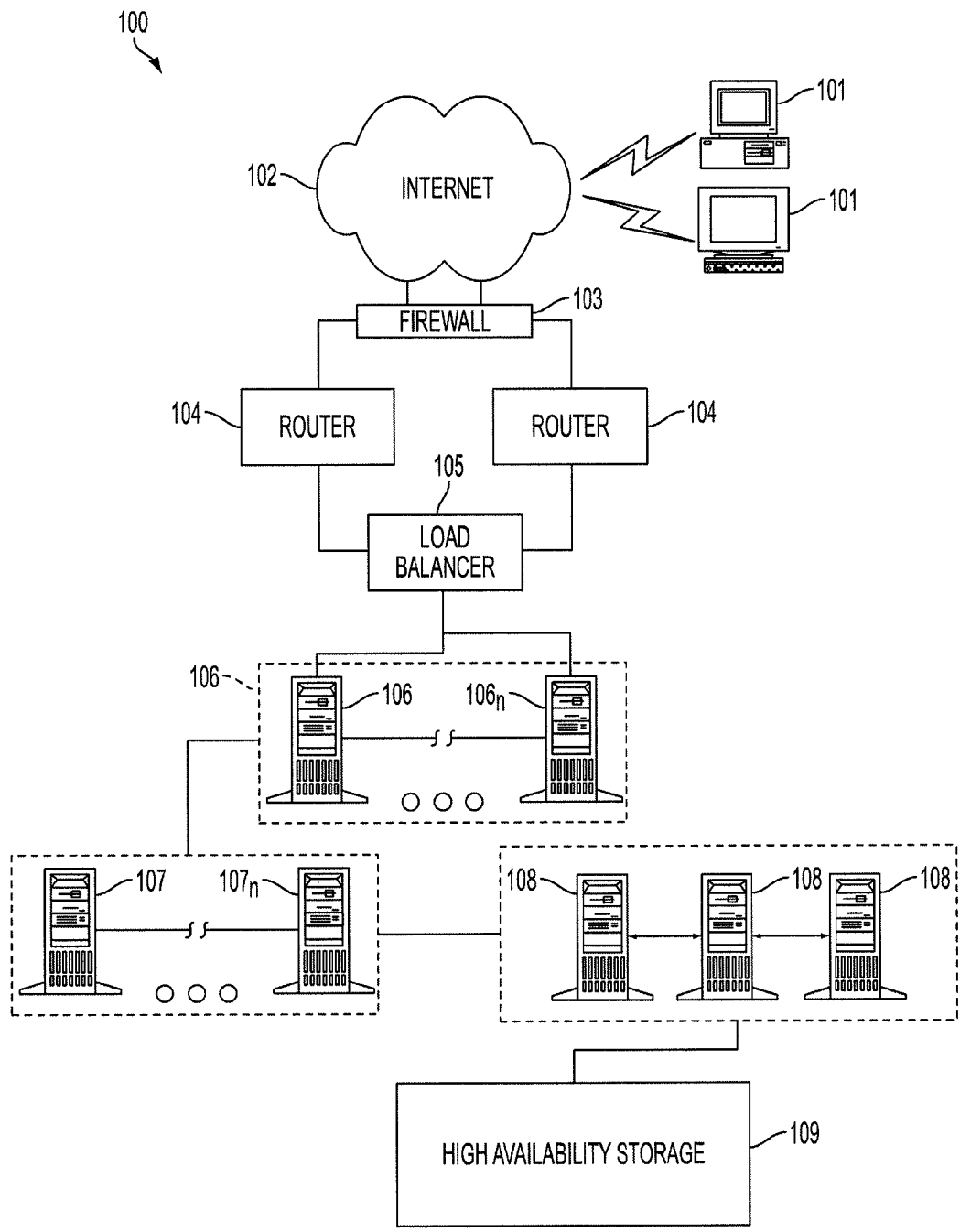
FIG. 1 is a schematic diagram of a general networked thermal response testing system, according to one embodiment of the present invention.

Various embodiments of the invention are discussed herein. Where specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose. All publications cited in this application are incorporated herein by reference.

Definitions, for the purposes of this application and as generally known in the art, are as follows:

A geothermal heat exchange resource, or geothermal resource, is defined as a portion of the earth or other heat storage medium having thermal properties. A geothermal heat exchange resource retains heat from within the Earth's core since the original formation of the planet, from radioactive decay of minerals, and from solar energy absorbed at the surface. Geothermal heat exchange resources may be found with ground and groundwater temperatures higher or lower than a target temperature of a particular application for heating and cooling above the earth's surface.

A borehole is the generalized term for any narrow shaft bored in the ground, or geothermal heat exchange resource, either vertically or horizontally. A borehole may also be referred to as an energy field, well field, loop field, or geofield.

A geothermal heat exchanger is a closed-loop piping system constructed beneath the surface of the earth to transfer heat between a fluid and the earth surrounding the piping system. A geothermal heat exchanger may use the earth as a heat source (in the winter) or a heat sink (in the summer). For the purposes of this application, a geothermal heat exchanger refers generally to the equipment, borehole and pipe, although in context it may refer only to equipment. A sample geothermal heat exchanger, or a sample borehole, refers to a test unit and its components installed within a targeted geothermal resource, to sample data and predict thermal response.

A fluid is a substance, as a liquid or gas, that is capable of flowing and that changes its shape at a steady rate when acted upon by a force tending to change its shape. Generally, the fluids used here are water, water/antifreeze combinations, or other suitable fluids for geothermal systems.

The term "time-dynamic" refers to a process or function that varies repeatedly with time, and is generally intended to refer to a multiple of cycles of processing, for example a series of heat pulses, or a series of pressure changes or varying flow rates over time, according to a predetermined or controlled plan.

The term "HVAC" refers to a heating, ventilation, and air conditioning system.

Aspects of the invention involve validating, predicting, or determining the thermo-physical properties of the geothermal heat exchange resource based on the measured properties of the fluid in the geothermal heat exchanger. The thermo-physical properties may include any properties relevant to a person of ordinary skill, including average thermal conductivity, thermal diffusivity, formation heat capacity, formation density, borehole resistance and/or other properties. Unlike the prior art, determining the actual thermal-physical properties of a sample geothermal heat exchange resource tested under time-dynamic conditions yields a significantly more accurate understanding of a geothermal resource and allows for the design of a significantly more efficient and effective geothermal HVAC system. Efficiency is improved by avoiding unnecessary borehole length or number, and effectiveness is improved by ensuring adequate thermal performance of the system to meet the needs of the particular installation.

Pressure refers generally to the force per unit area applied in a direction perpendicular to the surface of an object. Fluid pressure is defined as the pressure at some point within a fluid, such as water or air.

Mass density or density of a material is defined as its mass per unit volume.

Temperature is a physical property of matter that quantitatively expresses the common notions of hot and cold. Differences in temperature between regions of matter are the driving force for heat, which is the transfer of thermal energy.

The volumetric flow rate in fluid dynamics (also known as volume flow rate or rate of fluid flow) is the volume of fluid which passes through a given surface per unit time (for example cubic meters per second [$m^3 s^{-1}$] in SI units, or cubic feet per second [cu ft/s]).

The invention satisfies a need for test equipment exists that can automatically execute both static (analytical method) and dynamic (numerical method) tests. The ability to vary test parameters such as heating power and fluid flow rate according to time and other test conditions requires more sophisticated controls and equipment design than currently exists. Numerical methods according to the invention involve the injection of heat into a GHEX in a time-dynamic fashion and the generation of data for modeling thermal response of the geothermal resource, using adaptations of a simulation tool such as The Transient Energy System Simulation (TRNSYS) 16 Tool (Thermal Energy System Specialists, LLC) as well as adaptations of nonlinear optimization algorithms (see Hooke-Jeeves 1961, Nelder-Mead 1965).

FIG. 1 is a schematic diagram of a networked system 100 that provides multi-user access to data or information, such as geothermal TRT parameters and geothermal TRT data, stored at a central location. The method of the present invention may be implemented via a software program operating in a client-server environment. The software program may be part of a geothermal TRT control program or a separate program. The software program may include portions running on the client, the server, or both. System 100 is intended to be accessed by a plurality of clients or users 101. Such clients 101, in turn, suitably comprise one or more conventional personal computers and workstations. It should be understood, nevertheless, that other clients 101 such as Web-enabled, hand-held devices (e.g., "smart" phones) which use the wireless access protocol, and Internet appliances fall within the spirit and scope of the present invention.

Clients 101 of all of the above types suitably access system 100 by way of the Internet 102. By use of the term "Internet", it should be understood that the foregoing is not intended to limit the present invention to a network also known as the World Wide Web. It includes intranets, extranets, Virtual Private Networks (VPNs), Local Area Networks (LANs), Wide Area Networks (WANs), and the like.

Clients 101 are directed to web servers 106 through firewall 103, routers and proxy servers 104, and load balancer 105. Certificate servers (e.g., web certificate servers and wireless certificate servers) may optionally be deployed on each of the web servers $106_1, 106_2, \ldots 106_n$.

System 100 further comprises a plurality of application servers $107_1, 107_2, \ldots 107_n$, coupled to and providing support to the web servers $106_1, 106_2, \ldots 106_n$. System 100 further comprises a plurality of databases $108_1, 108_2, \ldots 108_n$, coupled to the application servers. High availability storage 109 for the database 108 is also provided.

Information and data relating to performing thermal response tests, analyzing thermal response tests, evaluating thermo-physical earth properties, etc. is stored in databases 108 and high availability storage 109. Clients 101 can access the database 108 through servers 106, 107. Of course, many variations of the above-described exemplary client-server environment are permissible within the scope of the present invention.

Figure 2:
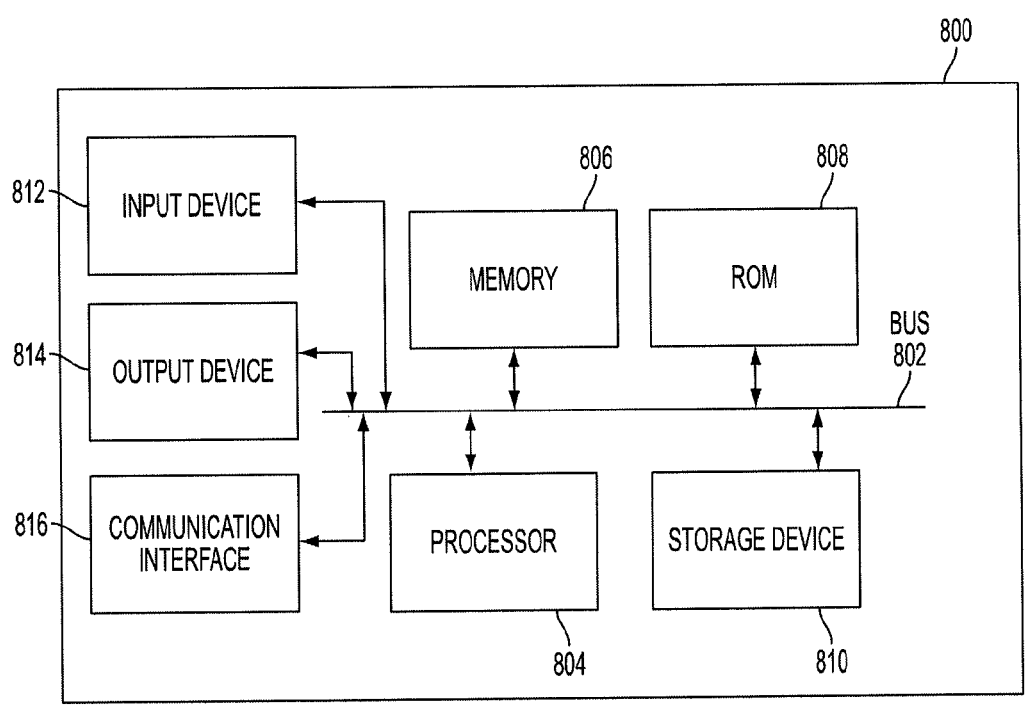
FIG. 2 is an exemplary block diagram of a computer system configured to execute the thermal response testing, according to one embodiment of the present invention.

FIG. 2 depicts an exemplary block diagram of a computer system 800 that may be configured to execute the method and/or software of the present invention, specifically, the test parameter inputs, automatic test control functions, test operator interface, data broadcasting and receiving functions, data logging, data analysis functions, report production, etc. Computer system 800 may include one or more components that may include a bus 802, a processor 804, a memory 806, a read only memory (ROM) 808, a storage device 810, an input device 812, an output device 814, and a communication interface 816.

Bus 802 may include one or more interconnects that permit communication among the components of computer system 800, such as processor 804, memory 806, ROM 808, storage device 810, input device 812, output device 814, and communication interface 816.

Processor 804 may include any type of processor, microprocessor, or processing logic that may interpret and execute instructions (e.g., a field programmable gate array (FPGA)). Processor 804 may comprise a single device (e.g., a single core) and/or a group of devices (e.g., multi-core). The processor 804 may include logic configured to execute computer-executable instructions configured to implement one or more embodiments. The instructions may reside in the memory 806 or ROM 808, and may include instructions associated with the processor 804.

Memory 806 may be a computer-readable medium that may be configured to store instructions configured to implement one or more embodiments. The memory 806 may be a primary storage accessible to the processor 804 and may comprise a random-access memory (RAM) that may include RAM devices, such as Dynamic RAM (DRAM) devices, flash memory devices, Static RAM (SRAM) devices, etc.

ROM 808 may include a non-volatile storage that may store information and computer-executable instructions for processor 804. The computer-executable instructions may include instructions executed by processor 804.

Storage device 810 may be configured to store information and instructions for processor 804. Examples of storage device 810 may include a magnetic disk, optical disk, flash drive, etc. The information and computer-executable instructions and information may be stored on a medium contained in the storage device 810. Examples of media may include a magnetic disk, optical disk, flash memory, etc. Storage device 810 may include a single storage device or multiple storage devices. Moreover, storage device 810 may attach directly to computer system 800 and/or may be remote with respect to computer system 800 and connected thereto via a network and/or another type of connection, such as a dedicated link or channel.

Input device 812 may include any mechanism or combination of mechanisms that may permit information to be input into computer system 800 from, e.g., a user. Input device 812 may include logic configured to receive information for computer system 800 from, e.g. a user. Examples of input device 812 may include a keyboard, mouse, touch sensitive display device, microphone, pen-based pointing device, and/or biometric input device, etc.

Output device 814 may include any mechanism or combination of mechanisms that may output information from computer system 800. Output device 814 may include logic configured to output information from computer system 800. Embodiments of output device 814 may include displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Communication interface 816 may include logic configured to interface computer system 800 with the internet 102 (See FIG. 1) and enable computer system 800 to exchange information with other entities connected to the internet 102, such as, for example, service provider, target environment, and cluster, etc. Communication interface 816 may include any transceiver-like mechanism that enables computer system 800 to communicate with other devices and/or systems, such as a client, a server, a license manager, a vendor, etc. The communications may occur over a communication medium, such as a data network. Communication interface 816 may include one or more interfaces that are connected to the communication medium. The communication medium may be wired or wireless. Communication interface 816 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 800 to any type of network.

Figure 3:
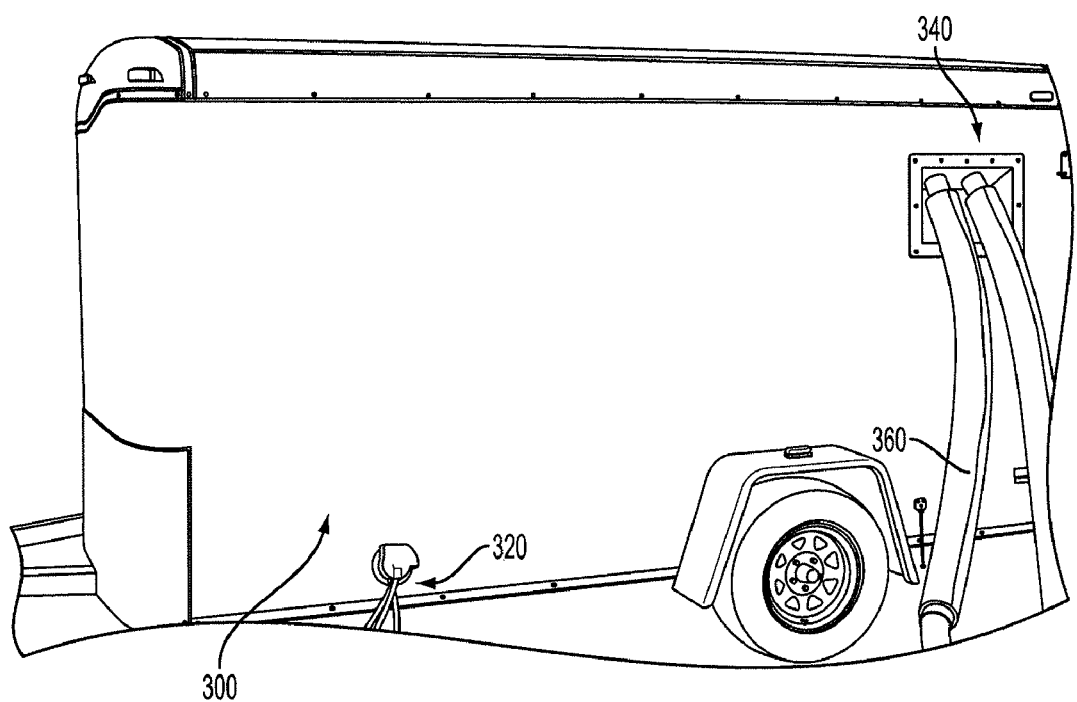
FIG. 3 is an exterior view of a self-contained mobile testing unit, according to an embodiment of the invention.

FIG. 3 depicts the exterior of a self-contained mobile testing unit 300, according to an embodiment of the invention. The exterior of the testing unit 300 includes an electrical power and remote power supply control connection 320 and a geothermal heat exchanger connection 340. The geothermal heat exchanger connection 340 further includes connection tubes having pipe insulation 360. The remote power supply control connection 320 may connect to a remote power source, for example, but not limited to, an internal-combustion electrical power generator (not shown).

Figure 4:
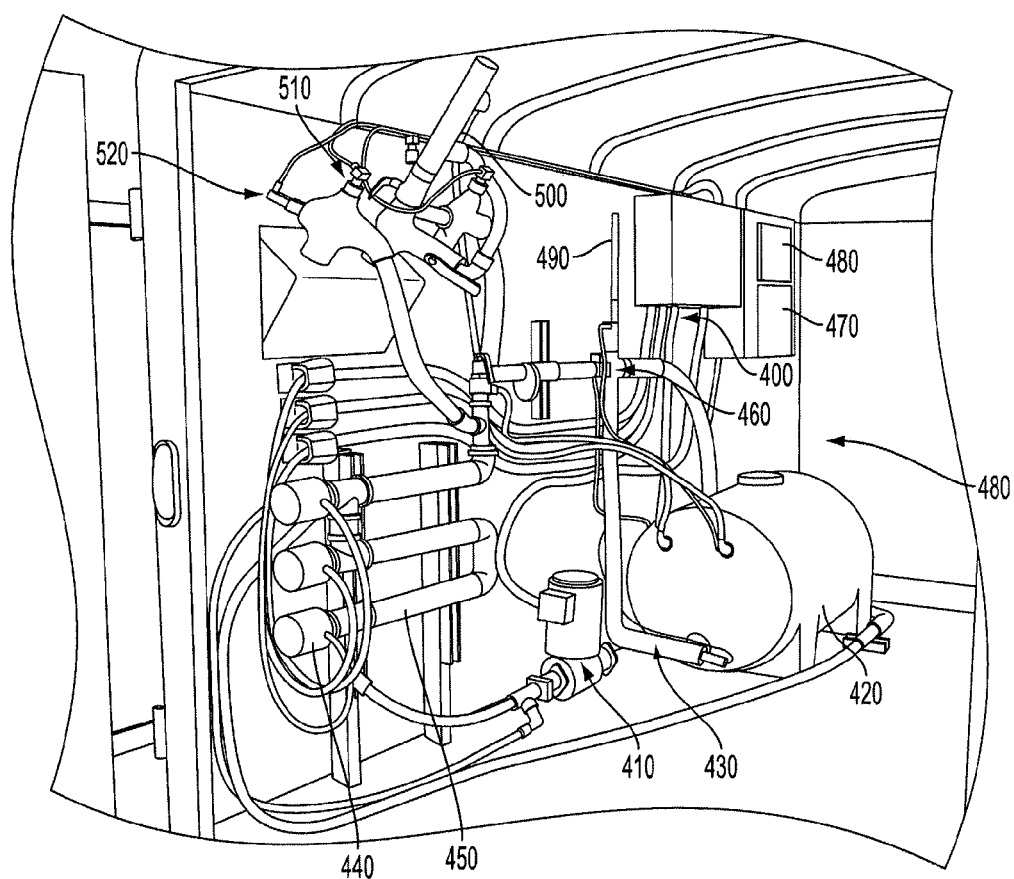
FIG. 4 is an interior view of the mobile testing unit of FIG. 3, according to an embodiment of the invention.

FIG. 4 depicts the interior of the mobile testing unit 300 of FIG. 3, according to an embodiment of the invention. The testing unit 300 includes an electrical power distribution 400, a variable speed pump 410, a fluid storage tank 420, a process control valve 430, heating elements 440, heat exchanger fluid piping 450, a flow rate sensor 460, a digital controller 470, a computer and operator interface 480, a fluid test chamber 490, a borehole sensor insertion device 500, a pressure, flow rate and/or fluid density sensor 510, and a temperature sensor 520.

Figure 5:
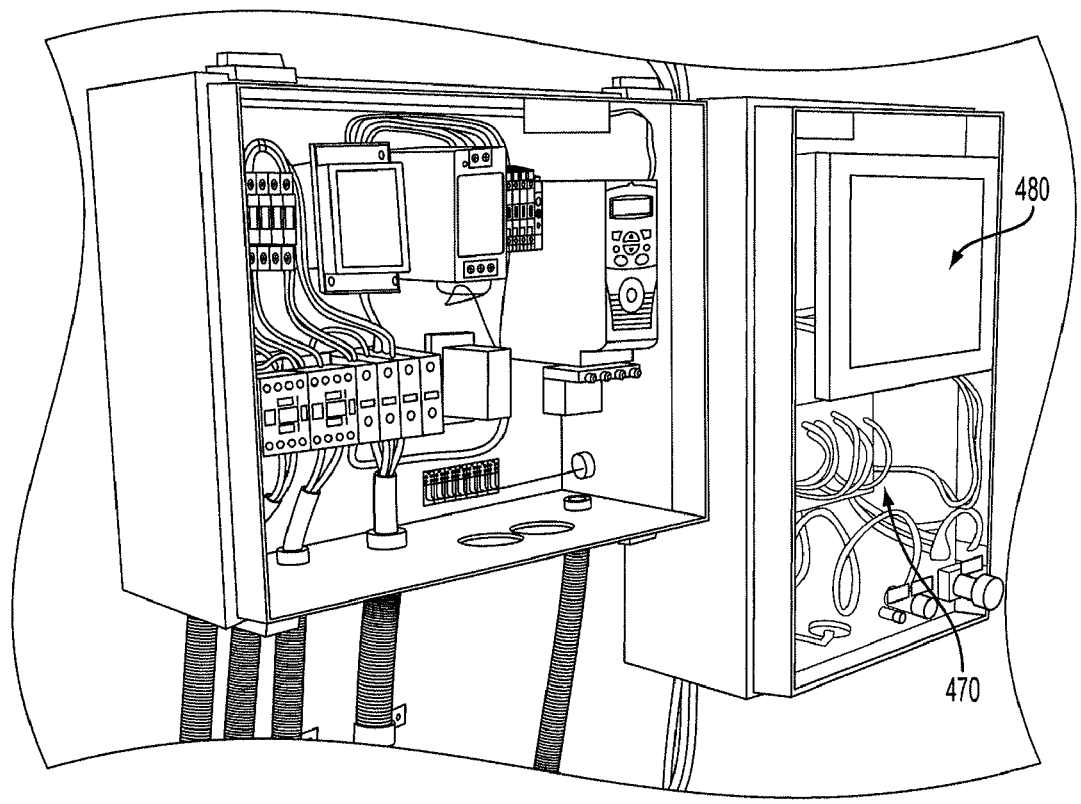
FIG. 5 depicts a computer and operator interface and a digital controller of the mobile testing unit of FIG. 3, according to an embodiment of the invention

FIG. 5 depicts the computer and operator interface 480 and the digital controller 470 of the mobile testing unit 300, according to an embodiment of the invention.

Figure 6:
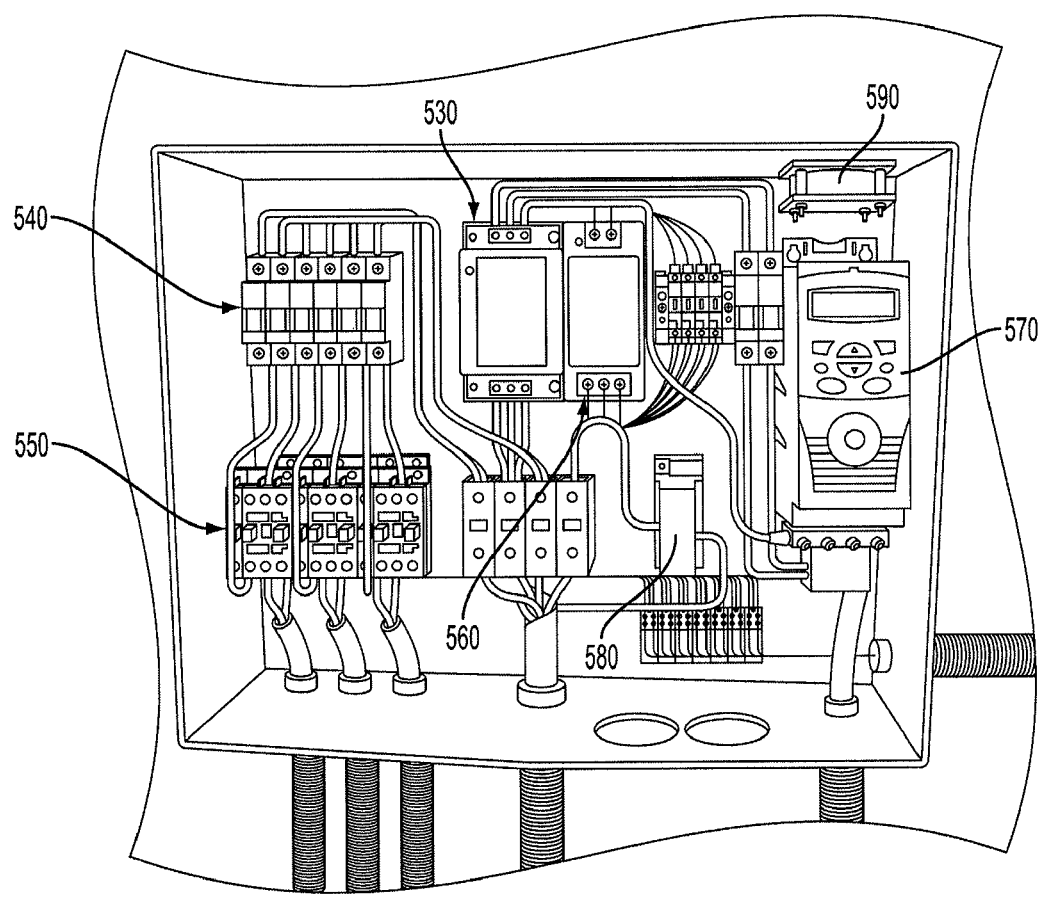
FIG. 6 depicts a power interface for the mobile testing unit of FIG. 3, according to an embodiment of the invention

FIG. 6 depicts a power interface for the mobile testing unit 300, according to an embodiment of the invention, including, but not limited to, a surge suppressor 530, fuses 540, heating element control contactors 550, a low voltage power supply 560, a variable speed pump controller 570, a power metering sensor 580, and a cooling fan 590.

Figure 7:
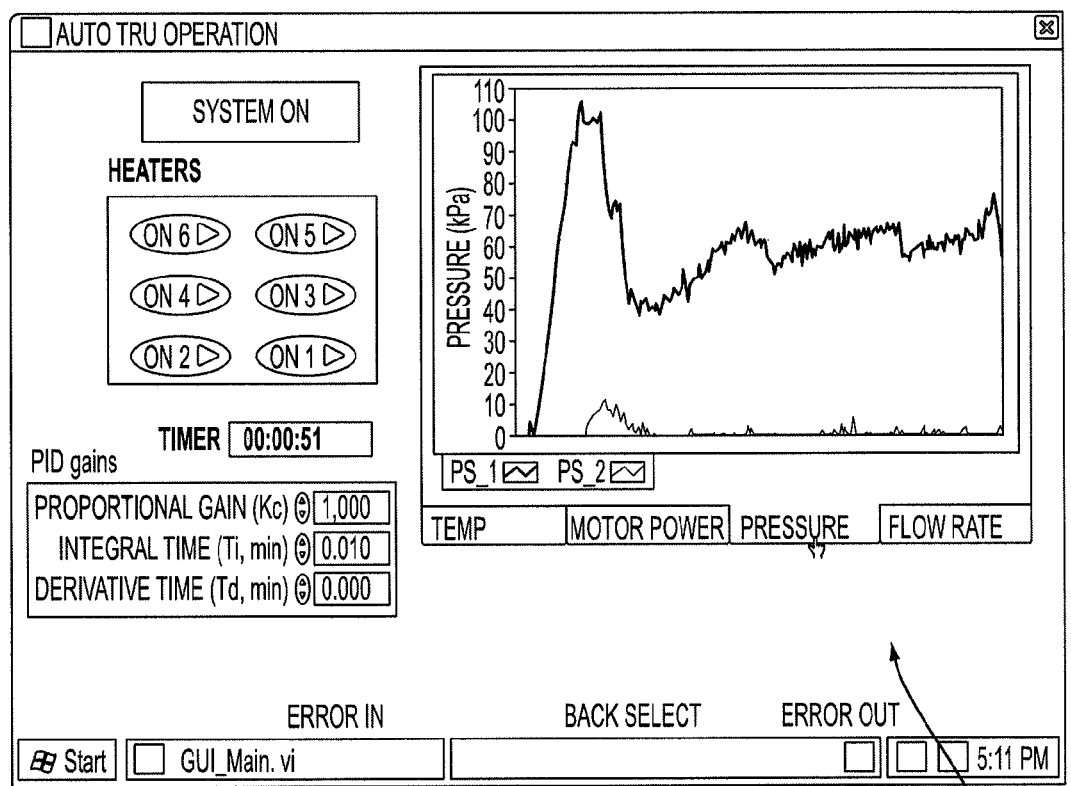
FIG. 7 depicts a display screen of the computer control algorithm and test interface, according to an embodiment of the invention.

FIG. 7 depicts a display screen of the computer control algorithm and test interface 600 to show actual thermal response test data and control sequencing, according to an embodiment of the invention. In one embodiment, the computer control algorithm and test interface 600 is shown on the computer and operator interface 480.

Figure 8:
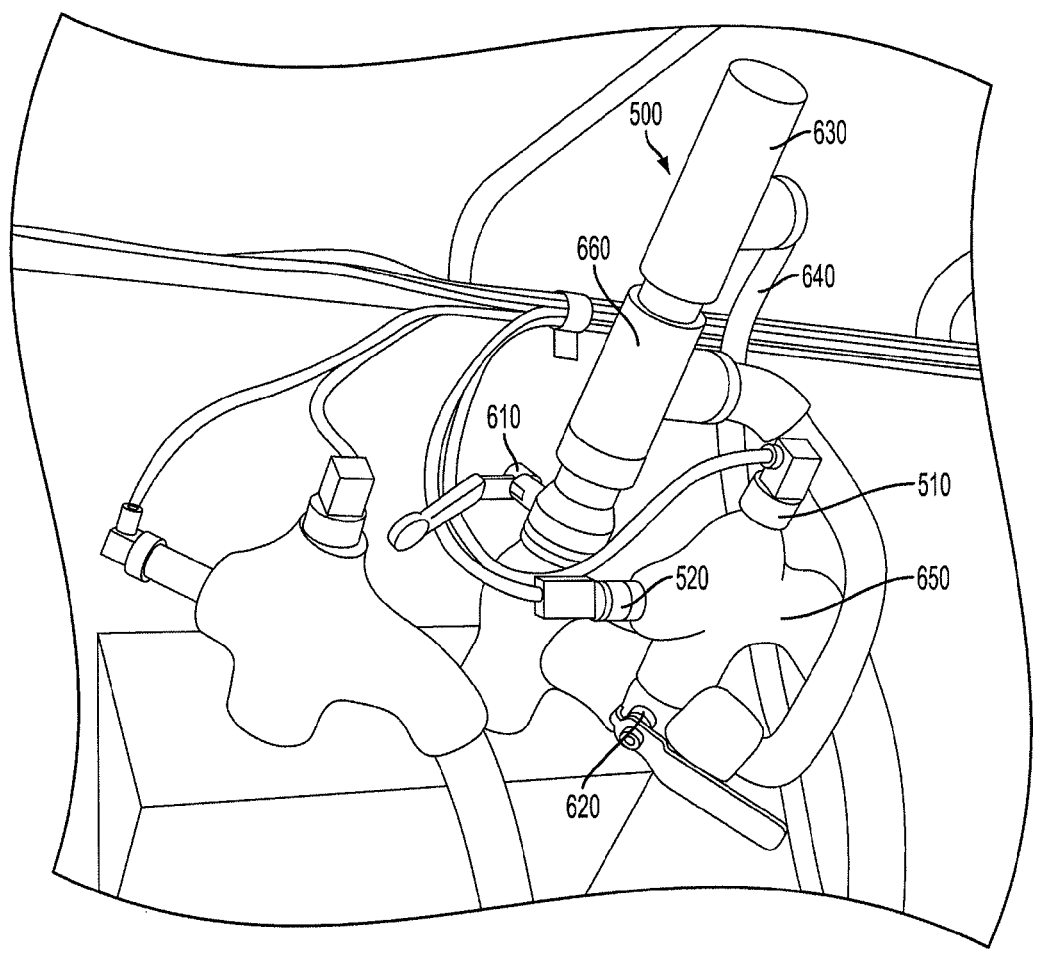
FIG. 8. depicts the borehole sensor insertion device of the mobile testing unit of FIG. 3, according to an embodiment of the invention.

FIG. 8 depicts the borehole sensor insertion device 500 of the mobile testing unit 300, according to an embodiment of the invention. In one embodiment, the borehole sensor insertion device 500 includes a transparent probe capture tube 660, a two-way valve 610, a three-way valve 620, an access port 630, and a drain line 640. In one embodiment, a pressure sensor 510 and a temperature sensor 520 may be connected to the borehole sensor insertion device 500. The fluid piping 650 may be configured such that the fluid may flow through the probe capture tube 660 or may bypass the probe capture tube 660 while still flowing past sensors 510 and 520. The downhole probe is not shown, but may include temperature, pressure, flow rate and/or fluid density sensors.

Figure 9:
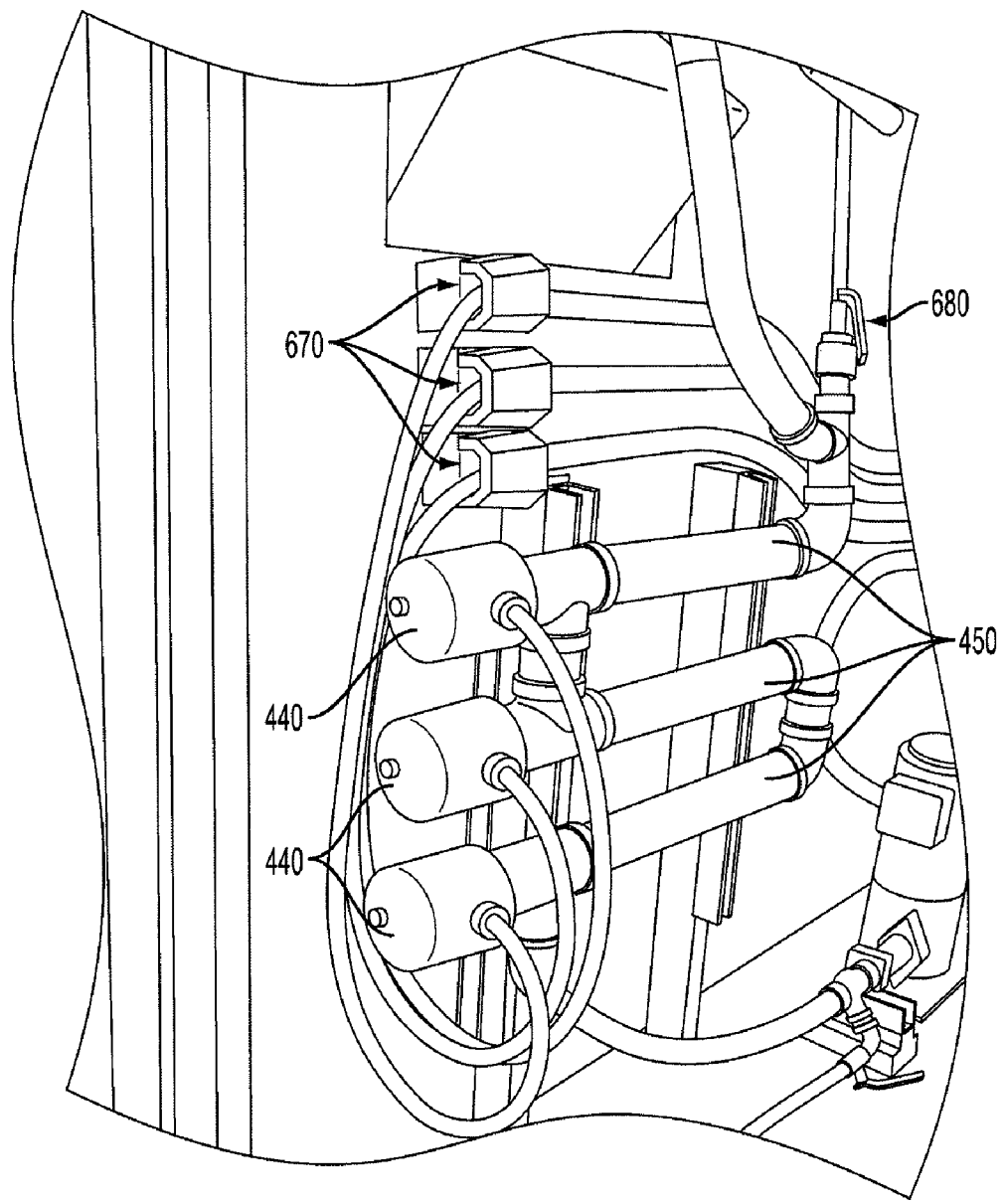
FIG. 9. depicts the electric heater elements of the mobile testing unit of FIG. 3, according to an embodiment of the invention.

FIG. 9 depicts the electric heater elements 440 of the mobile testing unit 300, according to an embodiment of the invention. In one embodiment, electric heater elements 440 may be connected in series within heat exchanger piping 450. In one embodiment, electric heating elements may connect to the electrical distribution system with quick-disconnect plugs 670 to allow elements to be easily removed for cleaning. In one embodiment, a pressure relief safety valve 680 may be coupled to the heat exchanger piping 450 as a safety measure.

Figure 10:
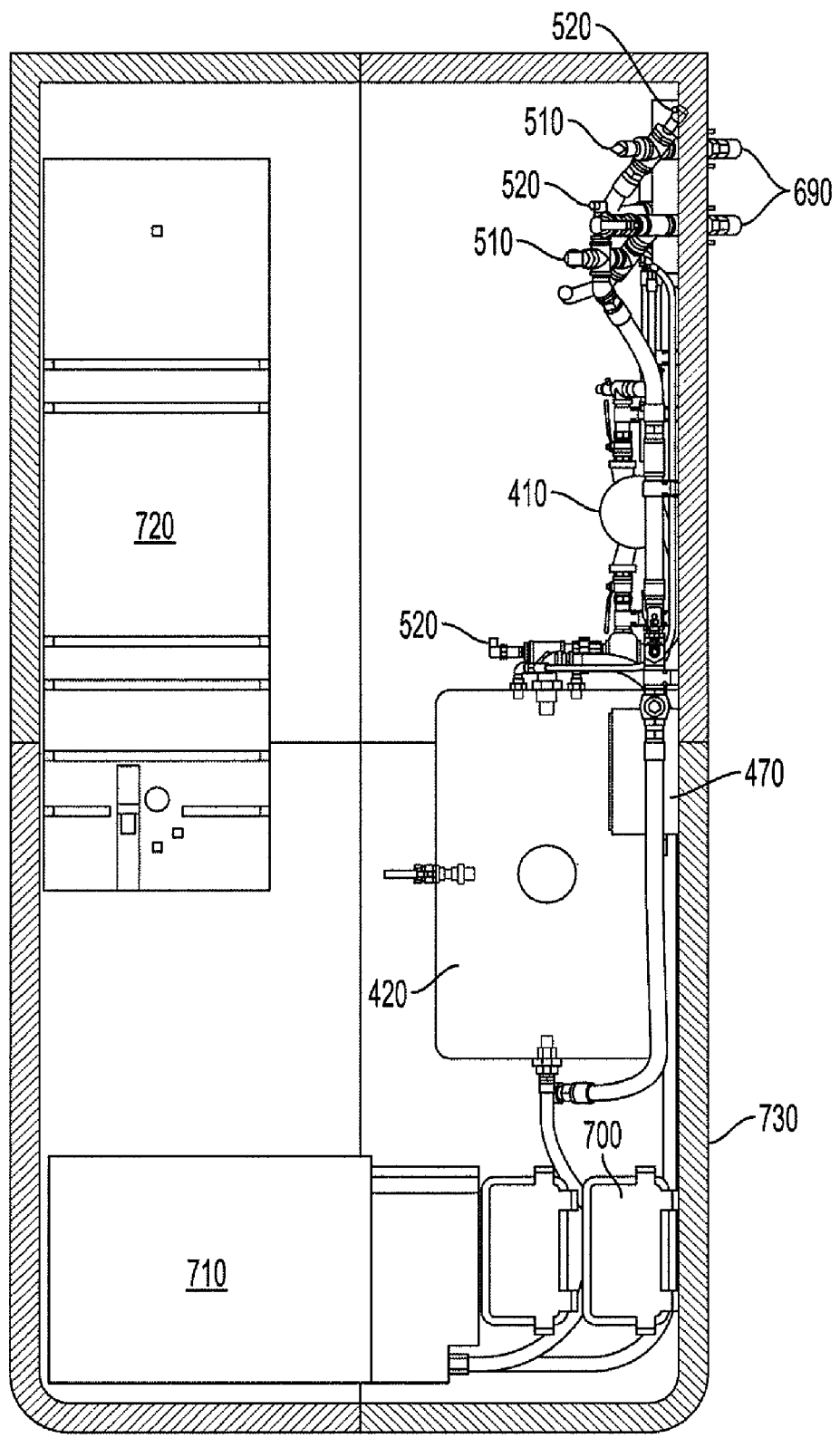
FIG. 10 is a schematic drawing of the mobile testing unit of FIG. 3, according to an embodiment of the invention.

FIG. 10 is a top-down schematic drawing of the mobile testing unit 300 of FIG. 3, according to an embodiment of the invention. The mobile testing unit 300 includes borehole connections 690 with associated sensors 510 and 520, a pump 410, digital controller 470, a fluid storage tank 420, batteries 700, a generator power supply 710 and a fuel tank 720. The mobile testing unit 300 is further encased by the mobile unit enclosure 730.

Figure 11:
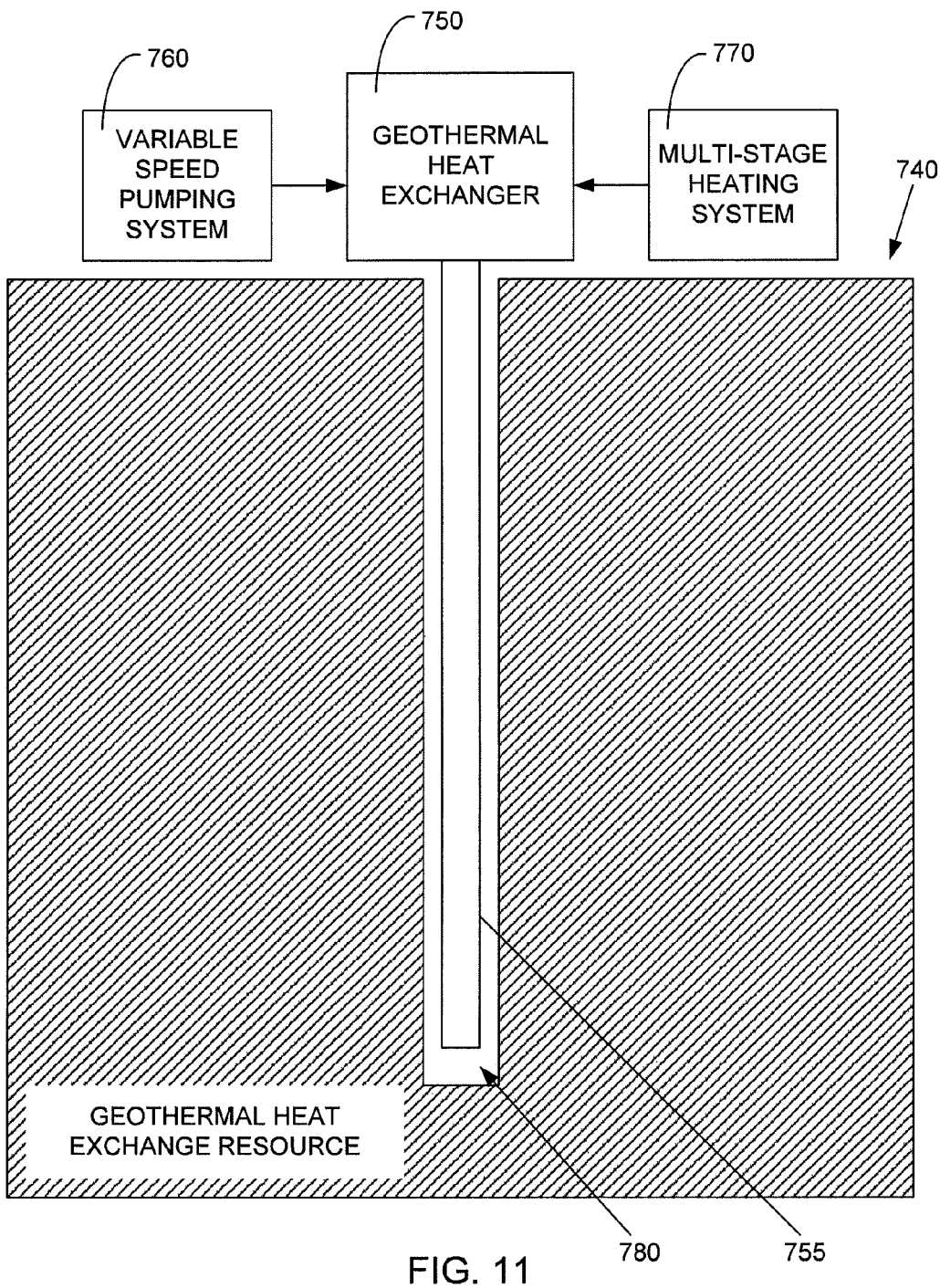
FIG. 11 is a general geothermal heat exchange resource and sample geothermal heat exchanger, according to one embodiment of the invention.

FIG. 11 shows a generalized geothermal heat exchange resource and a geothermal heat exchanger, according to an embodiment of the invention. The geothermal heat exchanger 750 is adapted to circulate a fluid through pipes 755 in a sample borehole 780 in the geothermal heat exchange resource 740. A variable speed pumping system 760 is capable of time-dynamic control of a fluid flow rate of the fluid. A multi-stage heating system 770 is capable of applying a series of time-dynamic heat pulses to the fluid. A fluid temperature sensor 520 (See FIG. 8) and one or more fluid pressure, fluid density and/or fluid flow rate sensors 520 (See FIG. 8) may be, or inserted into the pipes 755 (in addition to sensors deployed in line in the heat exchanger test rig 750. The sensors may measure data on the properties of the fluid that are predictive of the thermo-physical properties of the geothermal heat exchange resource.

Figure 12:
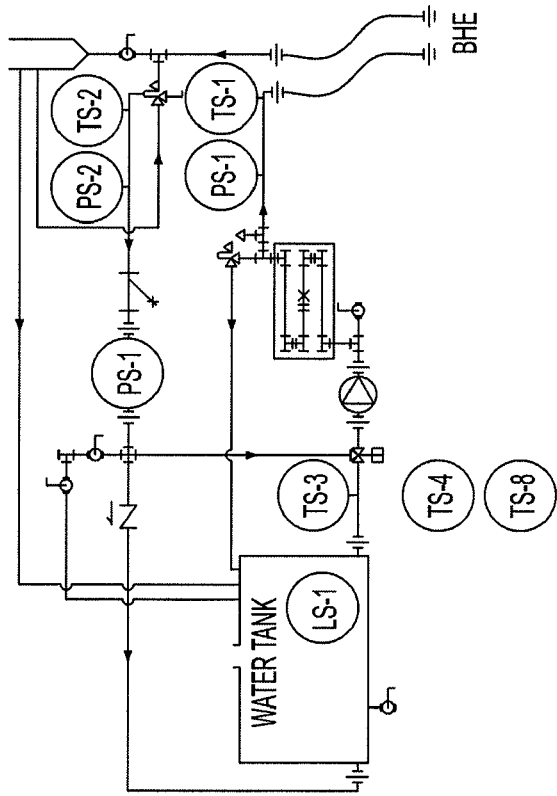
FIG. 12 is a mechanical schematic of the fluid piping system of the mobile test unit of FIG. 3, according to one embodiment of the invention.

FIG. 12 depicts a mechanical schematic of the fluid piping system of the mobile test unit 300, according to an embodiment of the invention.

Figure 13A:
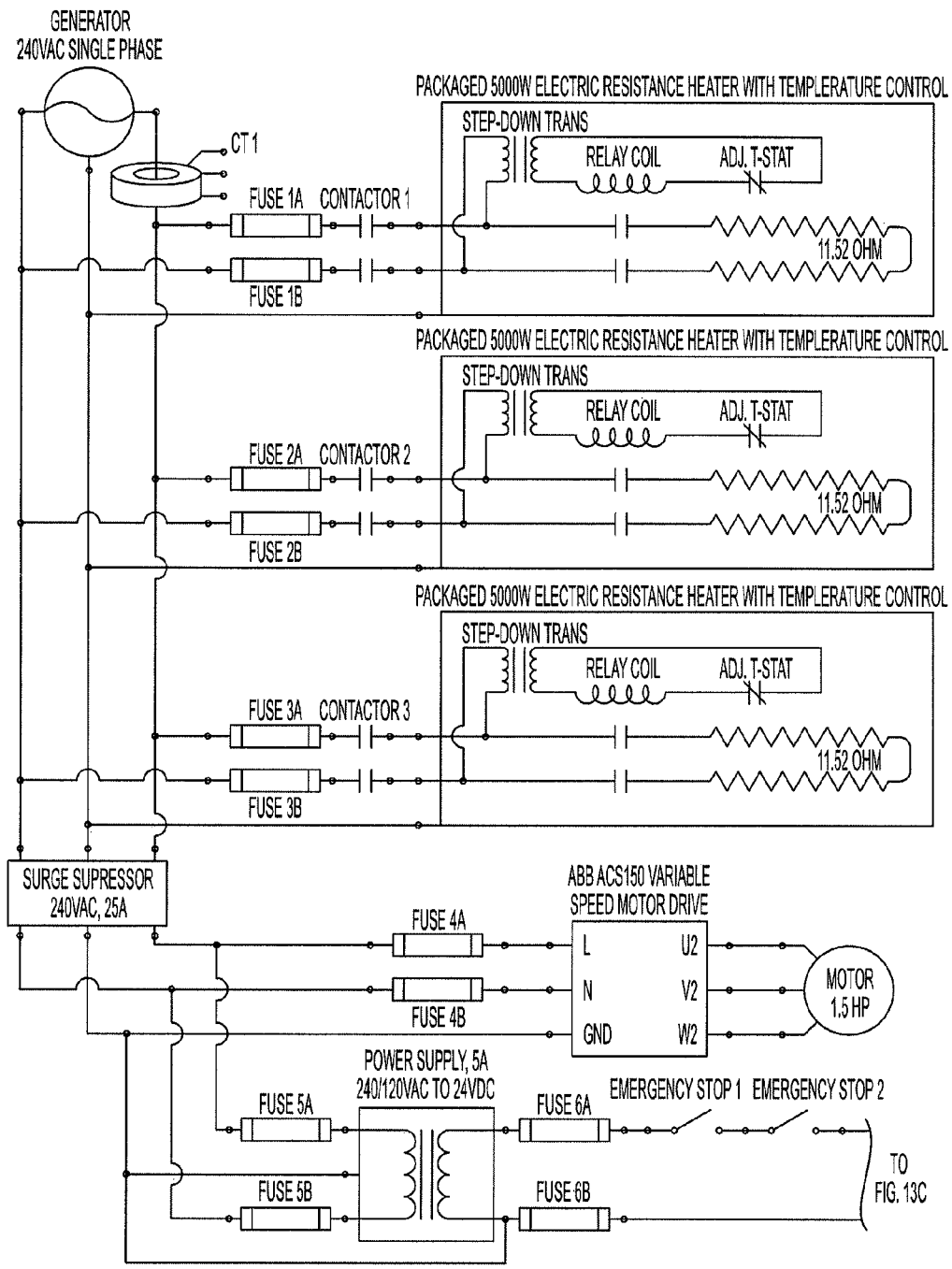
FIG. 13A is an electrical schematic of the operator interface.
Figure 13B:
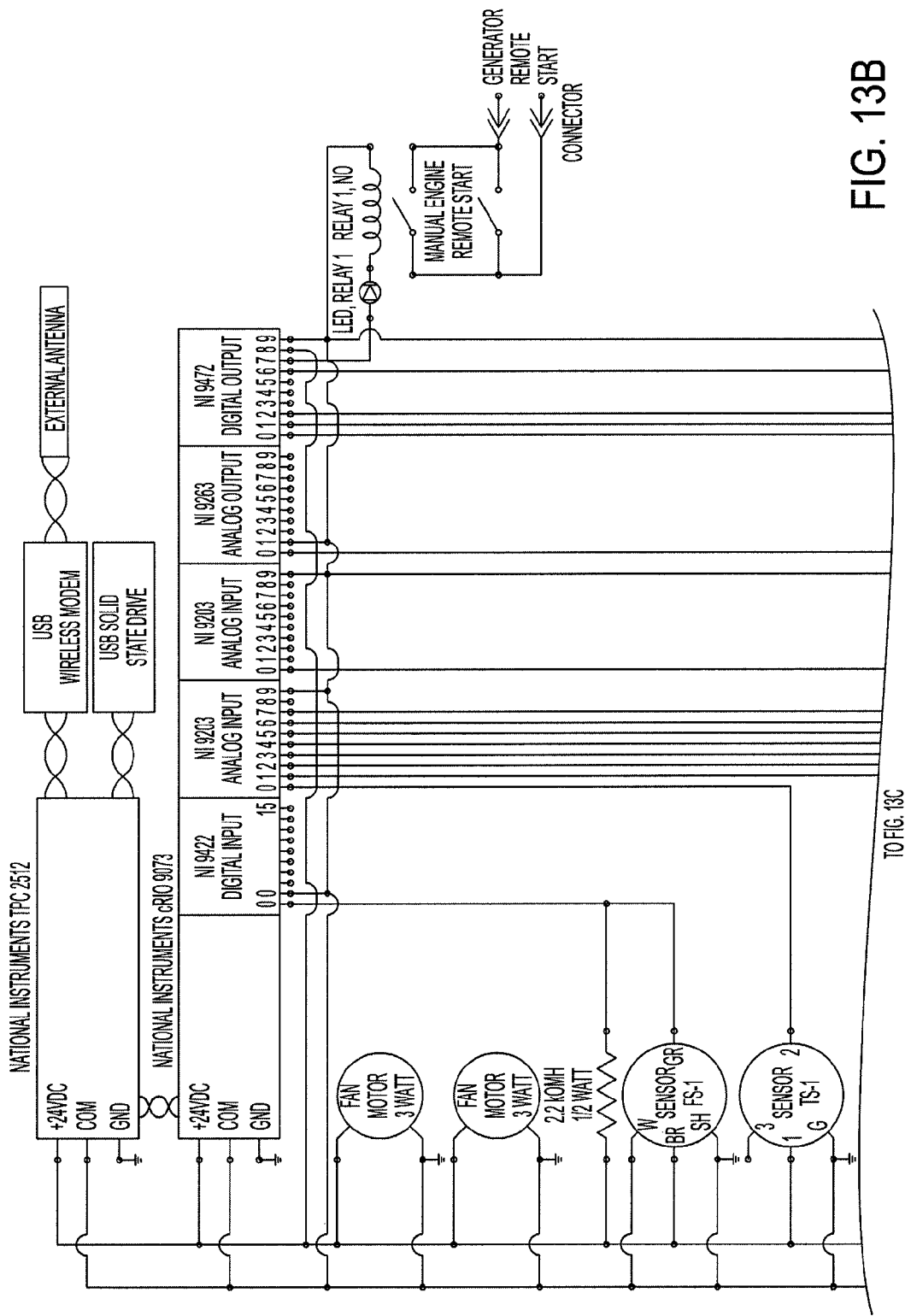
FIG. 13B shows the digital controller of the mobile testing unit of FIG. 3.
Figure 13C:
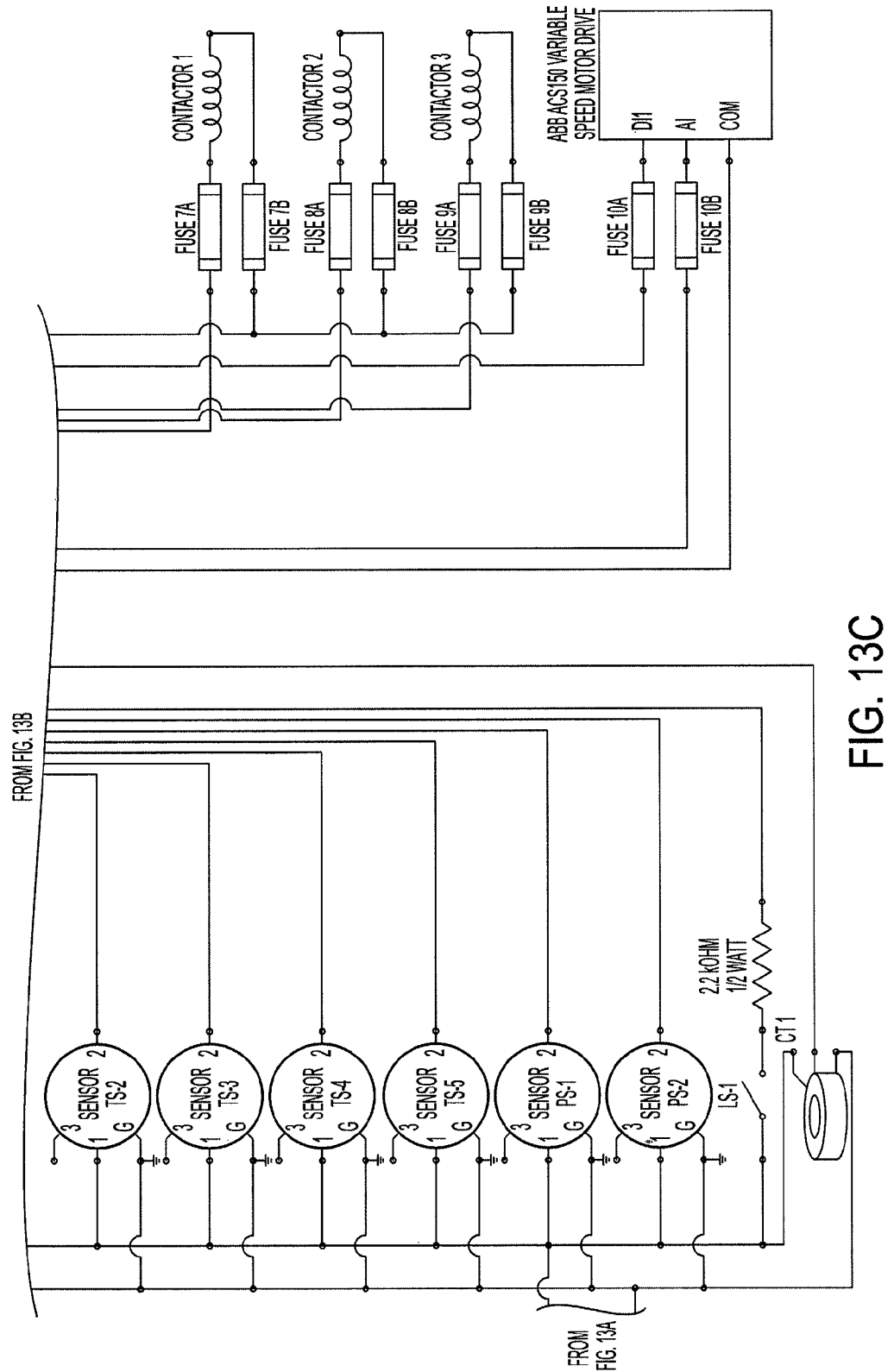
FIG. 13C shows a sensor array, according to one embodiment of the invention.

FIG. 13A-C depicts an electrical schematic of the operator interface 480 and the digital controller 470 of the mobile testing unit 300 as well as sensors and controlled devices as labeled.

FIG. 14 depicts a thermal response test result summary, according to an embodiment of the invention. The exemplary test result summary may include test site information, test parameters, results, a summary and a graph. The test site information may include the location of the test site, the test borehole depth and/or the exchanger pipe diameter. The test parameters may include average fluid flow rate, average test power, antifreeze type, antifreeze concentration and/or estimated flow type. The results may include the average undisturbed ground temperature, the average thermal conductivity and/or the average thermal diffusivity. The summary may project that the test site is either sufficient or insufficient to satisfy the building loads. The graph may show the thermal response test temperatures (temperature (° C.) v, time (hours)).

The present invention includes test equipment designed to utilize sophisticated hardware, software, sensors, and controls. As compared to the prior art, this equipment has the additional benefit of operating more autonomously, with lower failure rates, lower equipment maintenance costs, and generally fewer hours of human interaction and oversight.

Use of the above-described system and method results in collection of thermal-response test data, which may include parameters that vary with time (such as fluid temperature, fluid pressures, and fluid flow rate) and static parameters (such as fluid density, fluid heat capacity, and dimensions of the GHEX). This data may then be analyzed according to either (or both) the analytic and numerical methods, as known in the art and as described above. Analytical methods may utilize equations and tools such as Microsoft Excel. Numerical methods may utilize computer simulation tools such as TRNSYS 16 in conjunction with nonlinear optimization methods such as Hooke-Jeeves or Nelder-Mead. The results of this analysis will be a list of parameters (such as formation thermal conductivity, formation density, formation heat capacity, borehole thermal resistance, test GHEX dimensions, etc.) that can be used to correctly size the GHEX system for a building. This sizing analysis can be accomplished using one of the many available sizing/simulation tools (such as TRNSYS 16, Thermal Dynamics GLD, Gaia Geothermal GLD, and eQuest, among others). These tools vary in methodology and may include equations and computer simulations. The output of these tools (the design) may include information such as number of boreholes, depth, or average spacing.

Figure 15:
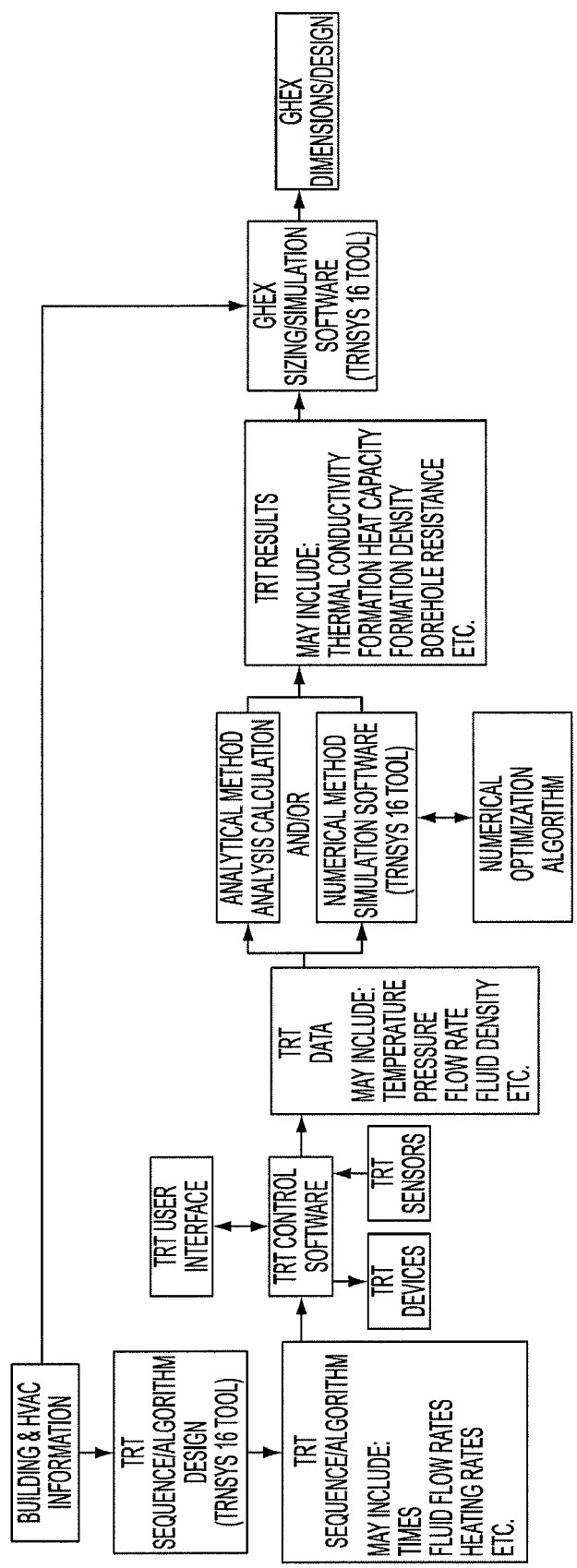
FIG. 15 is a block diagram of the method of the thermal response test, according to an embodiment of the invention.

FIG. 15 illustrates in schematic form the system and method for performing a TRT and using the resulting data to most efficiently design and dimension the GHEX system for a building on a specific site.

Testing Device Equipment

The test equipment of the present invention is preferably contained within a weather-resistant enclosure. The enclosure may be mobile, such as a tow-behind vehicle trailer, to allow the equipment to be transported to different test sites. Related test materials and maintenance materials may also be contained in the enclosure. The test device may be optimally configured as follows:

A system of fluid pipes transfers fluid between the test device and a test or sample GHEX borehole. Pipe insulation may be used to restrict heat transfer between the fluid and ambient air during testing.

A fluid tank provides a constant and positive static pressure to the suction side of a fluid pump. The tank also serves to purge air from the fluid as it circulates through the system. Additionally, the tank serves to facilitate the transport and mixing of water and other additives to the fluid.

A fluid level switch installed in the tank provides an indication when a significant volume of fluid is lost from the system, such as through a leak in the fluid pipes.

A temperature sensor installed in the fluid pipes measures the temperature of fluid exiting the tank.

A drain valve is installed to allow fluid to be drained from the fluid tank during transport and maintenance.

A centrifugal fluid pump is driven by an inverter-duty motor to pump fluid through the fluid pipes and through the GHEX pipes. The pump may operate at varying speeds to provide varying pressures and/or varying flow rates.

A 3-way valve installed between the fluid tank and the fluid pump allows the fluid to bypass the fluid tank during periods when the fluid within the tank may distort measurements of heat exchange within the GHEX.

A drain valve is installed to allow fluid to be drained from the fluid pump during transport and maintenance. This valve also allows antifreeze solution to be mixed from the fluid tank into the pump for protection from freezing and corrosion during storage periods.

One or more electric heating elements are installed in the fluid piping between the pump and the temperature and pressure sensors. The heating elements may be installed in series, instead of in parallel, in order to maximize turbulent fluid flow across the heating elements and to maximize control of fluid temperature. The electric immersion heating elements may have a power density between 20 and 50 Watts per square inch. The heating elements are fitted with threaded pipe connections and quick-disconnect electrical plugs to facilitate ease of cleaning and maintenance.

A mechanical pressure relief valve is installed in the fluid piping to relieve, and vent to the fluid tank, any system pressures exceeding a design working pressure.

A temperature sensor installed in the fluid pipes measures the temperature of fluid entering the GHEX.

A pressure sensor installed in the fluid pipes measures the pressure of fluid entering the GHEX.

A bulkhead pipe coupling and pipe connection fittings pass through the wall of the enclosure and facilitate connection to a GHEX.

A temperature sensor installed in the fluid pipes measures the temperature of fluid exiting the GHEX.

A pressure sensor installed in the fluid pipes measures the pressure of fluid exiting the GHEX.

An assembly of pipes and valves, including a three-way valve, a two-way valve, and a transparent tube, provides a means to insert a measurement probe into, and down the full length of a GHEX pipe. This assembly also provides a means to recapture the measurement probe from the GHEX pipe. The probe may include temperature and pressure logging devices.

A strainer is installed to capture large particles of debris from the fluid and also to dampen very turbulent fluid flows entering the flow rate sensor.

A flow rate sensor installed in the fluid pipes measures the volumetric flow rate of fluid exiting the GHEX. The flow rate sensor may be an electromagnetic type, an ultrasonic type, a vortices type, or other type of flow sensor that provides accurate and reliable readings for the fluid type used.

An assembly of pipes and valves, including two 2-way valves and a transparent tube facilitates measurement of fluid density using a hygrometer.

A temperature sensor installed within the enclosure measures the temperature of air inside the enclosure.

A temperature sensor installed outside of the enclosure measures the temperature of outside air.

Measurement and Controls Equipment

The invention may be powered by electricity. An electrical power source, such as a generator, is connected to the electrical distribution system. The electrical distribution system may include electrical cables, junction terminals, overcurrent protection devices such as fuses, disconnects, relay switches, receptacles, batteries, and voltage converters such as transformers.

The invention may control the electrical power source, such as a generator, automatically with the use of a remote start cable and a control relay. The control relay may receive a control signal from a digital-to-analog converter. The invention may start and stop the supply of electrical power from the electrical power source automatically according to the requirements of the test sequence. The invention may stop the supply of electricity as part of a fail-safe procedure.

The centrifugal fluid pump motor may be driven by a variable frequency drive (VFD). The VFD accepts electrical control signals from a digital-to-analog converter and responds by changing the rotational speed of the pump. The VFD may be used to vary the flow rate of the fluid in the system over time. The VFD may utilized in conjunction with a control algorithm, such as a proportional-integral-derivative (PID) algorithm, to hold constant a controlled parameter, such as flow rate of the fluid, within a time period.

One or more current transformers may measure the electrical power consumed by the invention and transmit an electrical signal to the analog-to-digital converter.

A central processing unit (CPU) may control test parameters such as pump motor speed, electric heating element power, electric power sources, and valve positions. The CPU may utilize a digital-to-analog converter to transmit electrical signals to controlled devices such as a relay or a VFD.

A central processing unit (CPU) may read, interpret, and record test parameters such as fluid flow rate, temperatures, pressures, level switch positions, valve positions, electrical current, electrical power, and other test parameters. The CPU may utilize an analog-to-digital converter to receive electrical signals from sensor devices, switches, and current transformers.

A human-machine interface (HMI) such as a touch-screen graphical user interface may communicate with the CPU to facilitate control over the test functions and monitoring of the test functions by a human operator. The HMI and CPU may be contained in a single device.

A data storage medium, for example a solid-state memory storage device, may be connected to the CPU and/or the HMI. The data storage medium may contain computer code to operate and control the invention. The data storage medium may be used to store data recorded during operation of the invention.

A wireless data transceiver may be connected to the CPU and/or the HMI. The purpose of the wireless data transceiver may be to upload data to a remote data management system, to download data from a remote data management system, to provide control of a test procedure by an operator in a remote location, or to provide monitoring of the test procedure by an operator in a remote location.

The wireless data transceiver may include an antenna located outside of the enclosure to maximize reception and transmission of wireless data signals.

Measurement and Control Computer Program Description

The invention may include measurement and control software, also referred to as a thermal response test procedure. Various embodiments of such thermal response test procedure is generally described below.

According to one embodiment, upon startup of the software, the supply generator may run a signal until after automatic test data uploads. The main menu may display various selectable modes and describe any fault shutdown signals.

According to another embodiment, a manual test mode may display instructions to an operator and may allow on-screen control of the pump motor, pump motor speed, relays and the generator run signal. The software may further display data for all sensors, including data relating to temperature, pressure, switch level, flow rate and voltage. The software may record "start/stop" data for all sensors and allow users to save such data to a file folder of a USB solid state drive.

According to a further embodiment, the software controlling a "standard mode" of the TRT, may display instructions to an operator, may save a start time and date to the file, may prompt an operator for the operator name, test address or coordinates, borehole number, heat exchanger pipe diameter, exact borehole depth, and may save text data to a file.

According to one embodiment, the software may perform any number of the following additional operations: 1) undisturbed ground temperature acquisition, 2) fluid quality test, and 3) setting test parameters.

According to a further embodiment, running the thermal response test (TRT) includes displaying operator instructions, setting the pump motor speed to match the test flow rate, engaging electric heat at a selected power interval, and displaying data for sensors. The computer software may display a VFD motor control signal and record data for all sensors. The software may continue the test until maximum test duration or fault shut down signal. The software may save all data to a file folder of a USB solid state drive and/or transmit data files to a remote web server over a wireless internet connection. According to one embodiment, after the file transfer is complete, or after five attempts to transmit, the computer software may change the generator run signal to "off" to remove test power.

According to another embodiment, running a dynamic mode of the thermal response test includes displaying instructions to an operator, entering test data, performing an undisturbed ground temperature acquisition, performing a fluid quality test, and selecting a test parameter reference file. The thermal response test may be run by setting a pump motor speed to match the test flow rate specified by the reference file (PID algorithm) and engaging electric heat at a selected power interval specified by the reference file. The computer software may then display data from the sensors. The computer software may continue the test until the reference file signals the end of the test or a fault shut down signal. The computer software may save all data to a file folder and/or transmit data or data file to a remote web server over a wireless internet connection. After the file transfer is complete, or after five attempts to transmit the software may change the generator run signal to "off" to remove test power.

According to one embodiment, the computer software may also implement fail safe test shut down functions, in which the values must be adjustable. The following may initiate a fail safe test shut down function: high temperature, high pressure, low fluid pressure and/or a pumping system failure.

The inventive system permits testing that is quicker and more accurate than prior art systems. A test procedure may be run in 12, 24, or 36 hours, or less or more time, in contrast to existing static systems that require significantly longer test periods to acquire meaningful data. Also, the inventive system is significantly more accurate than current geothermal resource analysis methods in determining the actual thermo-physical properties of the geothermal heat exchange resource at a given site.

While various embodiments of the present invention have been described above, it should be understood that they have been presented by way of example only, and not limitation. Thus, the breadth and scope of the present invention should not be limited by any of the above-described exemplary embodiments.

What is claimed is:

1. An apparatus for performing a thermal response test to determine thermo-physical properties of a geothermal heat exchange resource, comprising:
   a geothermal heat exchanger adapted to circulate a fluid through a loop in a sample borehole in the geothermal heat exchange resource;
   a variable speed pumping system capable of time-dynamic control of a fluid flow rate of the fluid;
   a multi-stage heating system capable of applying a series of time-dynamic heat pulses to the fluid;
   a fluid temperature sensor; and one or more fluid pressure, fluid density and/or fluid flow rate sensors, the sensors measuring data on the properties of the fluid that are predictive of the thermo-physical properties of the geothermal heat exchange resource.

2. The apparatus of claim 1, further comprising a computer-based controller to automatically execute a time-dynamic thermal response test procedure and record the thermal response test data to a digital storage media.

3. The apparatus of claim 1, further comprising a computer-based controller to automatically vary the fluid flow rate and time-dynamic heat pulses during the thermal response test procedure and record measurements from the sensors.

4. The apparatus of claim 1, further comprising a port to allow a downhole sensor probe to be inserted directly into the loop in the sample borehole.

5. The apparatus of claim 1, further comprising a data transmitter that transmits test data to a remote data repository system.

6. The apparatus of claim 1, further comprising a data transmitter that transmits the measured data to a remote monitoring and control system and a receiver that receives control information from the remote monitoring and control system.

7. The apparatus of claim 1, wherein the sample borehole is one of a vertical closed-loop geothermal borehole, a horizontal closed-loop geothermal borehole, or other heat storage medium.

8. The apparatus of claim 1, wherein the apparatus is housed in a self-contained mobile testing unit to be used on-site at the geothermal resource.

9. The apparatus of claim 1, further comprising at least one of a multiple stage heater, a variable speed pump, a direct digital control, a controller for a test to be run, and equipment to broadcast system measurement data wirelessly.

10. The apparatus of claim 1, further comprising the sample borehole and a downhole sensor probe inserted directly into the loop in the sample borehole.

11. A method for performing a thermal response test to determine the thermo-physical properties of a geothermal heat exchange resource, comprising:
providing a geothermal heat exchanger coupled with fluid in a sample borehole in the geothermal heat exchange resource;
performing a thermal response test on the geothermal heat exchange resource, comprising:
controlling a time-dynamic flow rate of the fluid using a variable speed pumping system, and
applying a series of time-dynamic heat pulses via a multi-stage heating system; and
collecting test data including fluid temperature and one or more of fluid pressure, fluid density and/or fluid flow rate, and determining the thermo-physical properties of the geothermal heat exchange resource.

12. The method of claim 11, wherein the thermal response test includes the further steps of:
controlling a pump motor speed;
engaging electric heat at a selected power interval;
enabling or disabling an external power source;
recording the measurement data for all sensors;
saving the measurement data to a storage medium; and
transmitting the measurement data to a web server.

13. The method of claim 11, further comprising the step of inserting a downhole sensor probe directly into a pipe in the sample borehole and collecting measured data from the downhole sensor probe.

14. The method of claim 11, wherein performing the thermal response load test utilizes at least one of variable heating power and a variable pump motor speed.

15. The method of claim 11, wherein the test data comprises at least one of ambient temperature, temperature in and out of a geothermal heat exchanger, tank temperature, pressure in and out of the geothermal heat exchanger, fluid flow rate and electrical power.

16. The method of claim 11, wherein performing the thermal response test occurs for a duration of less than 36 hours.

17. The method of claim 11, wherein the thermal response test includes at least one of the following steps: heating with a multiple stage heater, pumping with a variable speed pump, and controlling equipment via a computer.

18. The method of claim 11, further comprising designing a geothermal HVAC system based on the determined thermo-physical properties of the geothermal resource.

19. A non-transitory computer readable medium storing computer readable program code for causing a computer to perform a process that includes the steps of:
accessing a test procedure plan;
performing a thermal response test based on the test procedure plan, the thermal response test including the steps of:
controlling a time-dynamic fluid flow rate using a variable speed pumping system of a sample geothermal heat exchanger, and
applying a series of time-dynamic heat pulses via a multi-stage heating system;
recording measured test data from the thermal response test; and
saving the measured test data to a storage medium.

20. The non-transitory computer readable medium storing computer readable program code of claim 19, wherein the test further includes at least one of:
calculating test procedures and parameters based on the measured test data;
displaying at least one of the measured test data and control signals;
terminating the thermal response test if conditions exceed design limitations of the test procedure plan; and
transmitting the measured test data to a web server.

* * * * *